UNITED STATES PATENT OFFICE.

GEORGE A. DEITZ, OF DENVER, COLORADO.

METHOD OF PRESERVING GRAPES.

SPECIFICATION forming part of Letters Patent No. 247,543, dated September 27, 1881.

Application filed January 5, 1881. (No specimens.)

*To all whom it may concern:*

Be it known that I, GEORGE A. DEITZ, of Denver, in the county of Arapahoe and State of Colorado, have invented a new and Improved Method of Preserving Grapes; and I do hereby declare that the following is a full, clear, and exact description of the same.

My method of preserving grapes consists in packing or embedding them in carbonized wheat bran or hulls, which substance has a disinfecting quality and tends to exclude the air and prevents its circulation, as well as maintains a comparatively even temperature.

In carrying out said method I prepare the bran by parching or partially carbonizing it, and then pack or embed the fresh grapes therein without much pressure.

I have discovered that grapes thus packed will be preserved a longer time and in better condition than when packed in other fine material commonly employed heretofore—such, for example, as sawdust, uncarbonized bran, fine-cut paper, and kiln-dried meal.

What I claim is—

The method of preserving grapes which consists in packing or embedding them in carbonized wheat-bran, as hereinbefore specified.

In testimony that I claim the above I have hereunto subscribed my name in the presence of two witnesses.

GEO. A. DEITZ.

Witnesses:
JAS. H. CROSSLEY,
W. H. HIBBARD.